July 8, 1924.
D. B. REARDON
ROAD SURFACING MACHINE
Filed Dec. 1, 1921
1,500,529
2 Sheets-Sheet 1
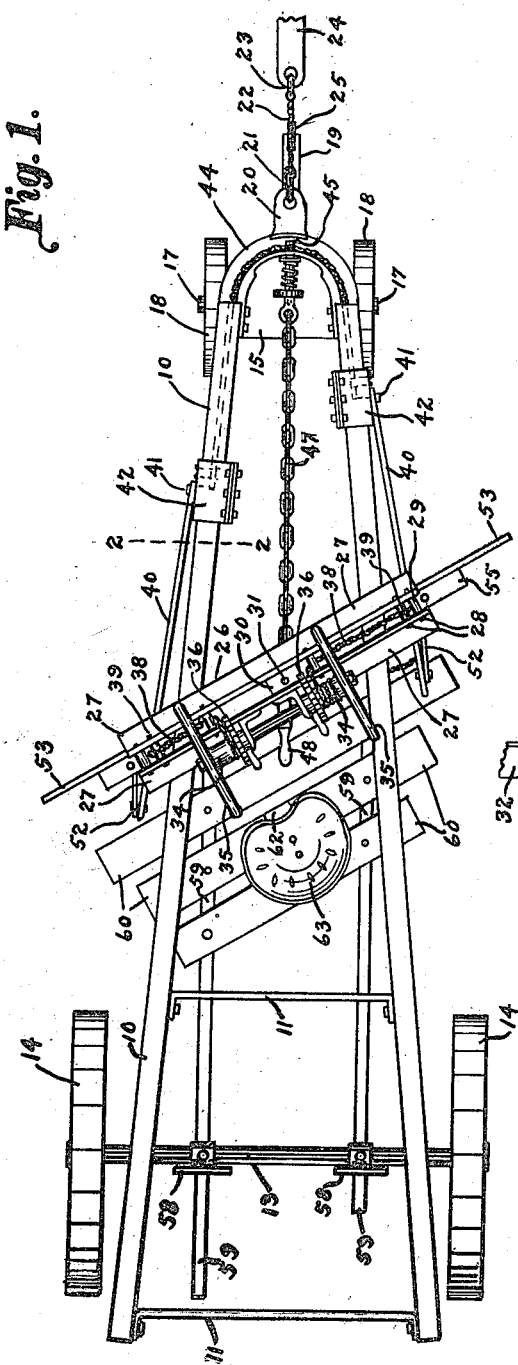
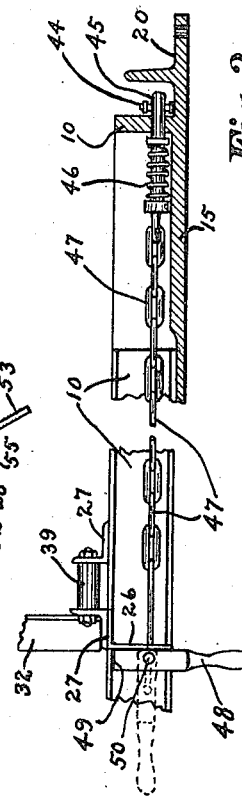
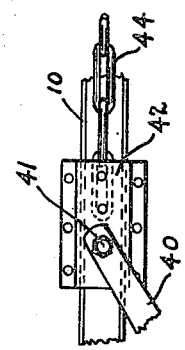
Inventor
D. B. Reardon.
By Arthur H. Sturges.
Attorney July 8, 1924.
D. B. REARDON
ROAD SURFACING MACHINE
Filed Dec. 1, 1921    2 Sheets-Sheet 2
1,500,529
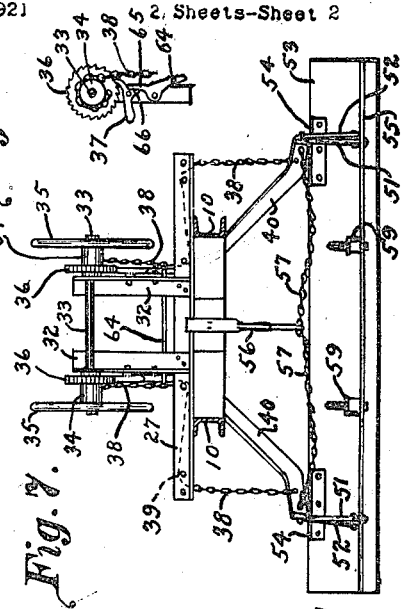
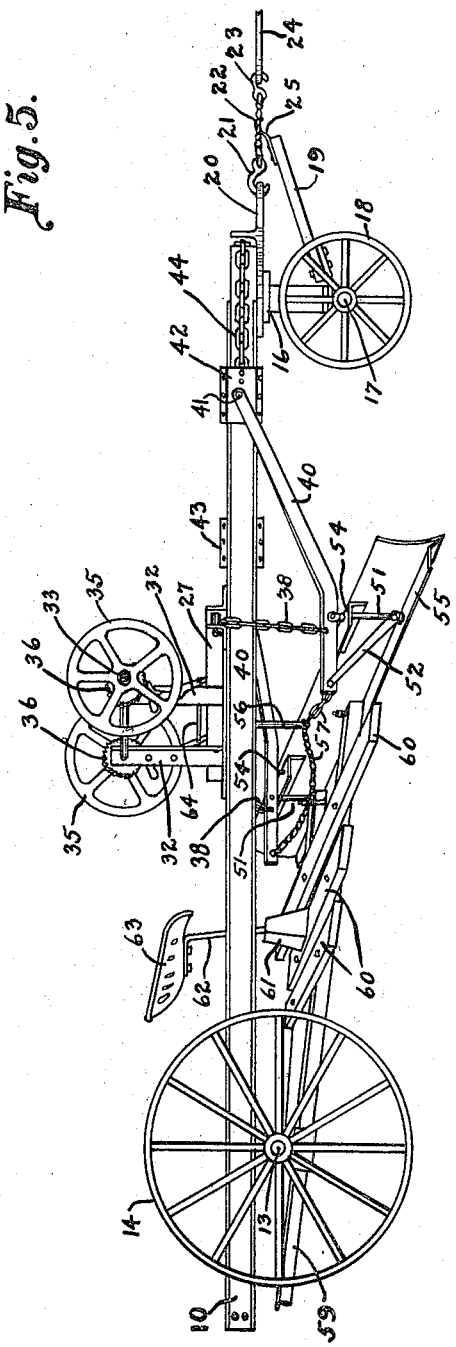
Inventor
D. B. Reardon.
By Arthur H. Sturges.
Attorney Patented July 8, 1924.

1,500,529

UNITED STATES PATENT OFFICE.

DANIEL B. REARDON, OF COUNCIL BLUFFS, IOWA, ASSIGNOR TO BERNARD S. REARDON, OF SIOUX FALLS, SOUTH DAKOTA.

ROAD-SURFACING MACHINE.

Application filed December 1, 1921. Serial No. 519,114.

*To all whom it may concern:*

Be it known that I, DANIEL B. REARDON, a citizen of the United States, residing at Council Bluffs, in the county of Pottawattamie and State of Iowa, have invented certain new and useful Improvements in Road-Surfacing Machines, of which the following is a specification.

The present invention relates to road maintainers or surfacing machines adapted for use in the building and repair of roadways.

An object of the present invention is to provide a machine of this type which may be easily handled on the road, which may be easily adjusted to varying conditions as to the slope or inclination of the surface of the roadway and also adjusted as to the desired transverse angle of the scraper.

Another object is to provide a machine of this type with an adjustable scraper and with suitable connections between the scraper and the seat for the operator for imposing at all times and at all adjustments upon the scraper the weight of the operator.

The invention further aims at the provision of novel means for effecting the transverse angular adjustment of the scraper and for locking the scraper in position when adjustment is had. This object also embodies features of independent vertical adjustment of the opposite ends of the scraper and means for releasing either independently or simultaneously the opposite ends of the scraper for lowering the same.

A still further object of the invention is to provide an improved draft connection and steering connection whereby tension of the draft is transmitted directly to the body or frame of the machine and the steering or guiding parts are relieved from such tension and are free to operate independently of such tension and sustain only the weight of the adjacent end of the machine.

The above, and various other objects and advantages of this invention will in part be described in, and in part be understood from the following detailed description of the present preferred embodiment, the same being illustrated in the accompanying drawings; wherein:

Figure 1 is a top plan view of a road maintainer or surfacing machine constructed according to the present invention.

Fig. 2 is a detail enlarged sectional view taken through one side of the frame on the line 2—2 of Fig. 1 and showing a slide block in position.

Fig. 3 is a fragmentary sectional view, enlarged, taken centrally through the forward end of the frame and showing the locking means for holding the scraper blade in transversely adjusted position.

Fig. 4 is an enlarged side elevation of a portion of the frame showing the block of Fig. 2 and its connections.

Fig. 5 is a side elevation of the machine.

Fig. 6 is a rear elevation thereof.

Fig. 7 is a transverse section taken through the forward part of the machine and looking rearwardly, and Fig. 8 is a fragmentary sectional view taken through one of the locking devices for holding the scraper in elevated position.

Referring to the drawings by numerals, 10 designates the frame or body portion of the machine which is horizontally disposed and comprises one or more links of channel iron preferably having the channel opening outwardly. This frame is bent substantially U-shape with the side portions flaring rearwardly and the intermediate part rounded and located at the forward end for a purpose which will appear. The frame 10 is reinforced at suitable points throughout its length with transverse braces 11 and carries near its rear end and at opposite sides bearings 12 through which are secured a rear axle 13 upon which are mounted the rear wheels 14.

The forward end of the frame has fitted therein a plate or platform 15 which is bolted or otherwise suitably secured to the frame and which serves not only as a reinforcement for the frame but as a support for the king bolt 16 and the front axle 17 which is carried thereby. The axle 17 is provided with front steering wheels 18 and a forwardly projecting pole piece or tongue 19 used for swinging the axle 17 in the desired direction. The frame 10 is provided at its forward end with an apertured projection 20 adapted to detachably receive therein a hook 21 of a draft chain 22 which may have a second hook 23 at its forward end for engagement in a draw bar 24 of a tractor or the like. The tongue 19 carries a hook 25 upon its forward end which is adjustably engaged with the draft chain 22 for connecting the tongue 19 to the same and for swinging the same with the draft chain into various angles relatively to the line of travel of the machine.

The frame 10 has an intermediate cross brace 26 upon which is pivotally mounted a cross beam 27 and the latter is preferably composed of a pair of angle bars arranged with the flange of each extending vertically and connected together by bolts 28 and spacers 29. A spacing plate 30 is arranged between the angle bars 27 intermediate the ends thereof and forms a support for a pivot 31 which is carried upon the cross brace 26. The bars 27 carry a pair of transversely spaced apart standards or uprights 32 carrying a transverse shaft 33 in their upper ends and upon which are mounted a pair of drums 34. The drums 34 each have a hand wheel 35 and a ratchet wheel 36, the latter co-operating with a locking dog 37 carried by the adjacent standard 32 for holding the drum 34 from unwinding. On each drum is mounted a chain 38 and the chains 38 pass down between the angle bars 27 and over idlers 39 to the outer ends of the bars 27 and from which the chains are suspended. These chains 38 are attached at their lower ends to the rear end portions of connecting arms 40 which are pivotally connected at 41 and at their forward ends to blocks 43 slidably mounted upon the opposite sides of the frame 10. As best shown in Figures 2 and 4, each block 43 comprises a metallic plate bent U-shape and fitted to the outer side of the frame with its free edge portions lying exteriorly of the frame bar and provided with retaining clips 43 which overlap the inner side of the frame for holding the block 42 thereon. The blocks 42 are connected to the ends of a chain 44 which is slidably disposed about the forward rounded end of the frame 10. The blocks are held in adjusted position upon the sides of the frame by locking bolt 45 slidably disposed in the forward end of the frame and adapted to be projected forwardly by spring 46 into position through an adjacent link of the chain 44 for holding the latter against sliding movement. The bolt 45 has a chain 47 or latch cord connected thereto which extends rearwardly to the brace 26 and has connections with a pull lever 48 which, as shown in Figure 3, is yieldingly held by the spring 46 and chain 47 against the rear side of the cross brace 26, and which has a flat end 49 and is pivotally connected in spaced relation to the end 49 at 50 to the chain 47. The flat end 49 of the lever is adapted to be turned against the cross brace 26 by swinging the lever 48 into a horizontal position as shown in dotted lines in Figure 3 for drawing the chain 27 rearwardly and releasing the latch bolt 45 and for holding the latch bolt in such position.

The pivoted arms 40 carry near their rear ends a pair of depending shafts 51 and a pair of braces 52 is connected between the rear extremities of the arms 40 and the lower ends of the shafts 51 for bracing the latter in vertical position. A scraper blade 53 is carried by the shafts 51 and comprises a sheet metal body portion of desired length and width which has at its upper edge a pair of bracket plates 54 through which the shafts 51 extend, and the scraper 53 further has a rearwardly extending flange 55 across its rear face and near its lower edge. The shafts 51 are attached at their lower ends to a flange 55 and the latter also serves as a bracing or reinforcing means for the scraper 53. The cross beam, composed of the bars 27, carries a depending rod 56 to the lower end of which is attached a chain 57 which extends between the rear ends of the arms 40 for preventing the lateral swinging of the same to any appreciable extent.

The rear axle 13 is provided between the wheels 14 and near opposite ends, with a pair of depending hangers or straps 58 through which are slidably disposed a pair of beams 59 of angle iron or the like and which project forwardly and are connected to the flange 55 on the rear face of the scraper 53. The beams 59 carry a platform 60 which is made up of transversely extending boards or other suitable devices upon which the operator may stand and from which rises a socket 61 for receiving therein a spring seat post 62 upon which the usual seat 63 is carried. The platform 60 is connected to the beams 59 in such manner as to permit the relative movement of the beams as the angular position of the scraper 53 is changed. The beams 59 also transmit the weight imposed on the platform to the scraper 53 for utilizing the weight of the operator to press the scraper against the lower surface.

In use and operation, the machine is drawn forward by a tractor or the like through the draw bar 24. The stress of draft is imposed in a direct line through the cable 22 to the frame 10 and the pole 19 is relieved of all draft pressure and merely holds and guides the axle 17 in the line of pull of the draft chain. Deflection of the draft chain toward either side draws the pole 19 therewith and thus turns the machine in such direction without imposing the strain of the draft through the king bolt 16 or other steering connections.

When it is desired to change the angular position of the scraper 53 beneath the frame it is only necessary to retract the locking bolt 25 from the chain 38 and operate one of the drums 34 to lower one end of the scraper 53 into contact with the roadway. The dragging of such end of the scraper causes the latter to swing into the desired direction and when the correct angular position is had the operator releases the lever 48 and permits the locking bolt 45 to spring forwardly and lock the chain 44 in adjusted position.

The drums 34 may be simultaneously or independently released by foot pressure upon either or both ends of a cross bar 64 carried upon the lower ends of releasing pawls 65 pivotally mounted upon the uprights 32 and which have projecting portions which extend into the paths of shoulders 66 on the locking dogs 37 for releasing the latter from the ratchet wheels 36.

The hand wheels 35 may be independently or simultaneously turned to draw the chains 38 and thus raise the scraper to the desired height above or upon the road surface, and the weight of the operator is at all times urged upon the scraper to impart the desired tension to the same upon the road surface and to hold it in lowered position. It is apparent that when the scraper blade 53 is swung into different positions beneath the frame 10, the platform 60 follows the angular adjustment by virtue of the sliding connection between the beams 59 and their rear end supports.

It is of course understood that various changes and modifications may be made in the details of construction and design of the above specifically described embodiment of this invention without departing from the spirit thereof, such changes and modifications being restricted only by the scope of the following claim.

What is claimed is:

In a road maintainer, a frame, a scraper suspended beneath the frame, blocks mounted on the frame and connected to opposite ends of the scraper, a chain connecting the blocks together and extending around the forward end of the frame, a spring pressed bolt carried by the frame and adapted to extend forwardly through the chain for locking the same from sliding movement, a latch cord connected to the bolt, a lever pivotally connected between its ends to the latch cord and having a flat inner end and a flat edge at right angles thereto adapted to seat one at a time against said frame for maintaining the latch cord retracted and released, said lever also having a handle portion on its other end for manipulating the lever.

In testimony whereof, I have affixed my signature in presence of two witnesses.

DANIEL B. REARDON.

Witnesses:
HIRAM A. STURGES,
ARTHUR H. STURGES.